US012085972B1

(12) United States Patent
Palani et al.

(10) Patent No.: US 12,085,972 B1
(45) Date of Patent: Sep. 10, 2024

(54) SAMPLED BAND-GAP REFERENCE VOLTAGE GENERATORS

(71) Applicant: Mixed-Signal Devices Inc., Irvine, CA (US)

(72) Inventors: Rakesh Kumar Palani, New Delhi (IN); Srikar Bhagavatula, Irvine, CA (US)

(73) Assignee: Mixed-Signal Devices Inc., Irvine, CA (US)

( * ) Notice: Subject to any disclaimer, the term of this patent is extended or adjusted under 35 U.S.C. 154(b) by 181 days.

(21) Appl. No.: 17/657,462

(22) Filed: Mar. 31, 2022

Related U.S. Application Data

(60) Provisional application No. 63/169,560, filed on Apr. 1, 2021.

(51) Int. Cl.
*G05F 3/30* (2006.01)

(52) U.S. Cl.
CPC .................................... *G05F 3/30* (2013.01)

(58) Field of Classification Search
CPC .................................. G05F 3/30; G05F 1/468
See application file for complete search history.

(56) References Cited

U.S. PATENT DOCUMENTS 5,231,316 A * 7/1993 Thelen, Jr. ............. H03F 1/301 327/513
9,331,878 B2 5/2016 Cheng et al.
10,473,530 B2 11/2019 Fan et al.
11,043,936 B1 6/2021 Wu
11,374,583 B1 6/2022 Bhagavatula
11,469,761 B1 10/2022 Palani et al.
11,641,189 B2 5/2023 Wu
2002/0122285 A1 9/2002 Aoki et al.
(Continued)

FOREIGN PATENT DOCUMENTS

CN 103412606 A * 11/2013 ............ G05F 1/567
CN 104375551 A * 2/2015 ............ G05F 1/567
(Continued)

OTHER PUBLICATIONS

Choi et al., "A 110 nW Resistive Frequency Locked On-Chip Oscillator with 34.3 ppm/° C. Temperature Stability for System-on-Chip Designs", IEEE Journal of Solid-State Circuits, vol. 51, No. 9, Sep. 2016, pp. 2106-2118.
(Continued)

*Primary Examiner* — Thienvu V Tran
*Assistant Examiner* — Yahveh Comas Torres
(74) *Attorney, Agent, or Firm* — KPPB LLP

(57) ABSTRACT

Systems and methods for sampled band-gap reference voltage generators are described. An embodiment includes a band-gap reference voltage generator circuit that includes: a first load transistor, a second load transistor where the gates of the first and second load transistors are connected, a first bipolar transistor, a second bipolar transistor, where the bases of the first and second bipolar transistors are connected, a first capacitor where a first terminal of the first capacitor is connected to the emitter of the first bipolar transistor through a first switch and a second terminal of the first capacitor is connected to the emitter of the second bipolar transistor through a second switch.

9 Claims, 5 Drawing Sheets
(2 of 5 Drawing Sheet(s) Filed in Color)

(56) References Cited

U.S. PATENT DOCUMENTS

| | | | | |
|---|---|---|---|---|
| 2003/0137357 | A1 | 7/2003 | Ye et al. | |
| 2004/0189417 | A1 | 9/2004 | Fujita | |
| 2006/0262623 | A1 | 11/2006 | Sutardja | |
| 2009/0322416 | A1* | 12/2009 | Yuasa | G05F 3/30 327/539 |
| 2010/0271144 | A1 | 10/2010 | Mccorquodale et al. | |
| 2010/0277207 | A1 | 11/2010 | Mahdavi | |
| 2011/0128080 | A1 | 6/2011 | Wennekers et al. | |
| 2011/0267150 | A1 | 11/2011 | Fan et al. | |
| 2011/0316595 | A1 | 12/2011 | Bolton | |
| 2012/0098045 | A1 | 4/2012 | Tian et al. | |
| 2013/0113533 | A1 | 5/2013 | Aaltonen et al. | |
| 2014/0247095 | A1 | 9/2014 | Edwards et al. | |
| 2015/0346746 | A1* | 12/2015 | Huang | G05F 3/30 323/313 |
| 2016/0164529 | A1 | 6/2016 | Nakamura et al. | |

FOREIGN PATENT DOCUMENTS

| | | | | |
|---|---|---|---|---|
| CN | 106909194 A | * | 6/2017 | G05F 1/567 |
| DE | 102016113283 A1 | * | 1/2018 | G05F 1/567 |

OTHER PUBLICATIONS

Choi et al., "A 99nW 70.4kHz Resistive Frequency Locking On-Chip Oscillator with 27.4ppm/° C. Temperature Stability", Symposium on VLSI Circuits (VLSI Circuits), Kyoto, Japan, Jun. 17-19, 2015, pp. C238-C239.

Gürleyük et al., "A CMOS Dual-RC Frequency Reference With ±200-ppm Inaccuracy From -45° C. to 85° C.", IEEE Journal of Solid-State Circuits, vol. 53, No. 12, Dec. 2018, 10 pgs.

Liu et al., "A 2.5 ppm/° C. 1.05-MHz Relaxation Oscillator With Dynamic Frequency-Error Compensation and Fast Start-Up Time", IEEE Journal of Solid-State Circuits, vol. 54, No. 7, Jul. 2019, First Published: May 3, 2019, pp. 1952-1959, DOI: 10.1109/JSSC.2019.2911208.

Long, "Phase Locked Loop Circuits", UCSB/ECE Department, Apr. 27, 2005, 46 pgs.

Razavi, "Challenges in the Design High-Speed Clock and Data Recovery Circuits", IEEE Communications Magazine, vol. 40, No. 8, Aug. 2002, pp. 94-101.

Zhang et al., "A 3.2 ppm/° C. Second-Order Temperature Compensated CMOS On-Chip Oscillator Using Voltage Ratio Adjusting Technique", IEEE Journal of Solid-State Circuits, vol. 53, No. 4, Apr. 2018, First Published: Dec. 4, 2017, pp. 1184-1191, DOI: 10.1109/JSSC.2017.2772808.

* cited by examiner

SAMPLED BAND-GAP REFERENCE VOLTAGE GENERATORS

CROSS REFERENCE TO RELATED APPLICATIONS

This application claims priority under 35 U.S.C. 119(e) to U.S. Provisional Patent Application Ser. No. 63/169,560, entitled "Sampled Band-Gap Reference Voltage Generator", filed Apr. 1, 2021, and that is hereby incorporated by reference in its entirety.

FIELD OF THE INVENTION

The present invention generally relates to band-gap reference voltage generators and, and more specifically, to sampled band-gap reference voltage generators.

BACKGROUND

Generally, a band-gap reference voltage generator can stably provide a constant voltage irrespective of variation of temperature or external voltage. In an integrated circuit (IC), a change in temperature or in an external power supply voltage of the IC ideally will not exert influence upon the performance of the integrated circuit. The IC ideally performs its functions in a stable manner. Thus, a band gap reference voltage generator circuit that supplies a stable voltage is desirable. Such a band-gap reference voltage generator is widely used in ICs, such as ICs used in analog and radio frequency (RF) applications.

Flicker noise is a type of electronic noise with a 1/f power spectral density, i.e. its power density increases with decreasing frequency. It is also referred to as 1/f noise. Flicker noise can dominate at low frequencies. It can be a major consideration in low noise amplifier circuits, and RF circuits, among others.

Chopper stabilization, or chopping, is a technique that can be used to reduce amplifier offset voltage. 1/f noise can also be effectively reduced by this technique since 1/f noise is low frequency noise that is near dc. Chopper stabilization typically works by alternating or chopping the input signals at the input stage and then chopping the signals again at the output stage. This is the equivalent to modulation using a square wave.

SUMMARY OF THE INVENTION

Systems and methods for sampled band-gap reference voltage generators are described. An embodiment includes a sampled band-gap reference voltage generator circuit, including: core circuitry that includes: a first load transistor including a gate, a source and a drain; a second load transistor including a gate, a source and a drain, where the gates of the first and second load transistors are connected, and where the sources of the first and second load transistors are connected; a first bipolar transistor including a base, an emitter and a collector terminal; a second bipolar transistor including a base, an emitter and a collector terminal, where the bases of the first and second bipolar transistors are connected, and where the collectors of the first and second bipolar transistors are connected; and a first capacitor C1 having a first and a second terminal, where the first terminal of the first capacitor is connected to the emitter of the first bipolar transistor through a first switch and the second terminal of the first capacitor is connected to the emitter of the second bipolar transistor through a second switch; a second capacitor C2 having first and a second terminals, where the first terminal of the second capacitor is connected to the second terminal of the first capacitor and the second terminal of the second capacitor is connected to ground; a third switch connected to the first terminal of the second capacitor and going to an output.

In a further embodiment, the first switch and the second switch are operated in a first sampling period and the third switch is operated after turning off the first switch and the second switch.

In a further embodiment, similar instances are time interleaved.

In a further embodiment, the sampled band-gap reference voltage generator circuit further includes an operational amplifier (Opamp) with a first terminal, a second terminal, and a third terminal, where the first terminal is connected to the core circuitry through several switches and the second terminal is connected through a resistor divider that includes several resistors and the third terminal is connected to the gates of the first and second load transistors generating a current.

In a further embodiment, the sampled band-gap reference voltage generator circuit further includes a voltage to current converter.

In a further embodiment, an output voltage $V_{bg}$ is produced at a first node, where $V_{bg}$ is derived by the following equation:

$$V_{bg}=V_{be1}+n(V_{be1}-V_{be2})$$

where $V_{be1}$ is a base-to-emitter voltage of the second bipolar transistor, $V_{be2}$ is a base-to-emitter voltage of the first bipolar transistor, and n is a ratio of an area of the first bipolar transistor to an area of the second bipolar transistor (316), where $$V_{bg}=(n+1)V_{be1}-nV_{be2}=(n+1)(V_{be1}-n/(n+1)V_{be2})$$

where a ratio n/(n+1) is implemented by utilizing the first capacitor C1 and the second capacitor C2.

In a further embodiment, a first current and a second current are proportional to a value of output voltage $V_{bg}$.

In a further embodiment, the output voltage $V_{bg}$ is applied by an operational amplifier (Opamp) across a resistor divider formed by a first resistor and a second resistor to generate an output current that is proportional to the output voltage $V_{bg}$.

In a further embodiment, the sampled band-gap reference voltage generator circuit further includes a fourth switch used for sampling, where the first switch, the second switch and the fourth switch are clocked using Ø and the third switch is clocked using $\overline{Ø}$, being out of phase by 180 degrees.

In a further embodiment, the third switch is clocked using a time interleaved copy of $V_{bg}$, wherein the interleaved copy has similar first capacitor C1 and second capacitor C2 and the clock phases are separated by 180 degrees.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The description and claims will be more fully understood with reference to the following figures and data graphs, which are presented as exemplary embodiments of the invention and should not be construed as a complete recitation of the scope of the invention.

DETAILED DESCRIPTION OF THE DRAWINGS

Turning now to the drawings, sampled band-gap reference voltage generators in accordance with various embodiments of the invention are illustrated. In many embodiments, a band-gap reference voltage generator can be implemented by utilizing current sources in bipolar transistor where a mismatch in the current mirrors can be removed by dynamic element matching. In several embodiments, an input stage amplifier's offset contribution due to load pair is reduced to zero by rotating the load pair. In various embodiments, an output current source employed within the band-gap reference voltage generator is configured to have its output impedance (ro) boosted by utilizing a cascode topology. In many embodiments, a band-gap reference voltage generator can be utilized to generate a stable voltage independent of temperature and external voltage variations within a variety of circuits and systems including (but not limited to) frequency reference circuits, phase locked loop (PLL) circuits, and frequency locked loops (FLL) circuits.

Existing band-gap reference voltage generators can be sensitive to transistor mismatches in amplifiers utilized within the band-gap reference voltage generators. For low noise applications, chopping can be used in the amplifiers within a band-gap reference voltage generator because the amplifiers can contribute significant flicker noise, which can cause spurs and degrade the power supply rejection ratio.

In certain embodiments, sampled band-gap reference voltage generators can be sampled and interleaved such that the output voltage of the band-gap reference voltage generator is available during operation. Various sampled band-gap reference voltage generator circuits and applications in accordance with certain embodiments of the invention are discussed further below.

Sampled Band-Gap Reference Voltage Generator Circuits

Figure 1:
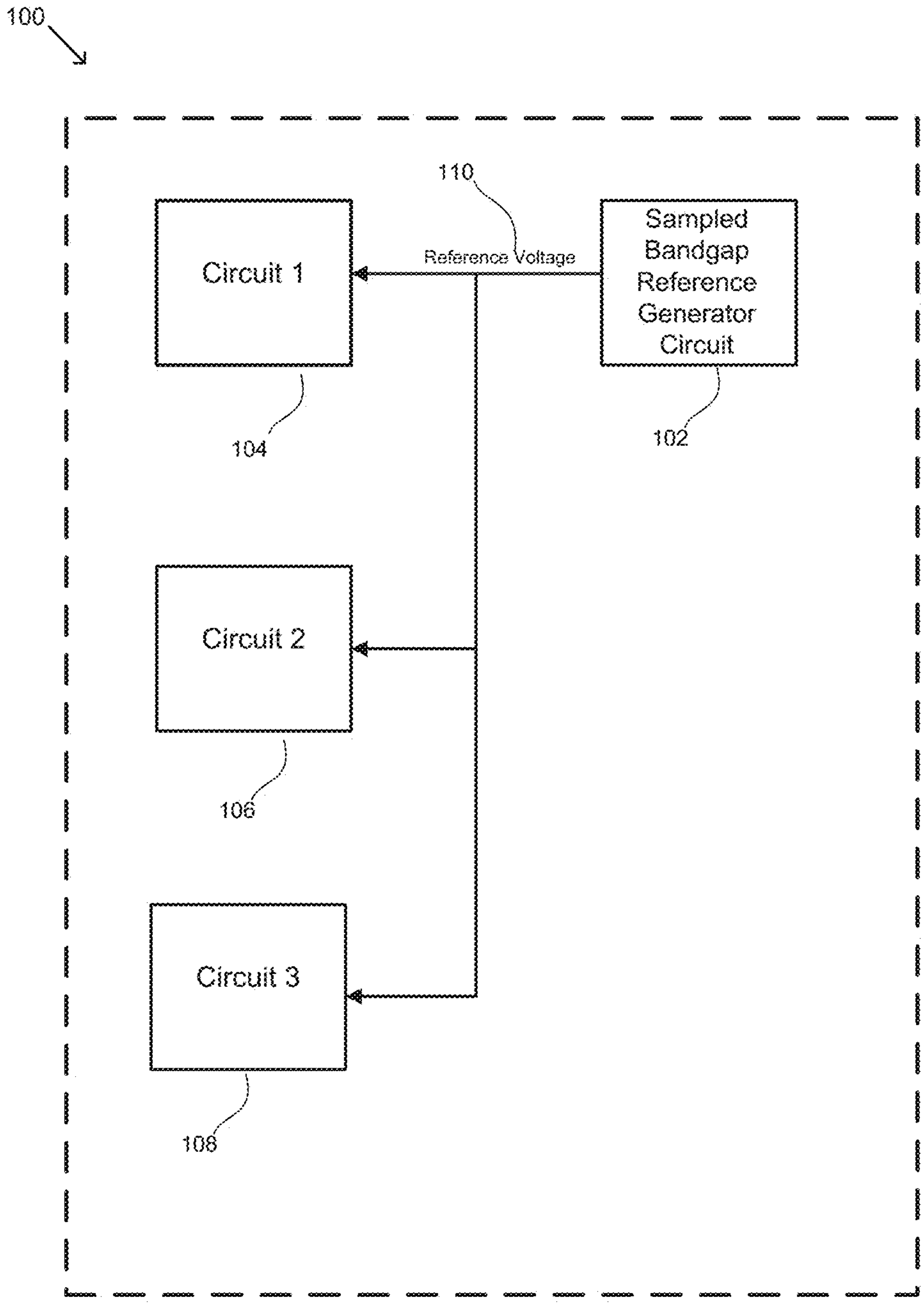
FIG. 1 conceptually illustrates a band-gap reference voltage generator circuit within an integrated circuit (IC), where the band-gap reference voltage generator circuit is capable of providing a stable reference voltage to various circuits within the IC in accordance with an embodiment of the invention.

Sampled band-gap reference voltage generator circuits can be utilized within an IC. A circuit diagram of an IC 100 in accordance with an embodiment of the invention is illustrated in FIG. 1. In the illustrated embodiment, a sampled band-gap reference voltage generator circuit 102 can provide a reference voltage 110 to various circuits (104, 106, 108) within the IC 100. In the IC 100, the generated reference voltage can have a predetermined level of stability as a function of temperature and as a function of IC's power supply variation.

Although various band-gap reference voltage generator circuits are described above with reference to FIG. 1, any of a variety of sampled band-gap reference voltage generator circuits may be utilized as appropriate to the requirements of specific applications in accordance with various embodiments of the invention. Sampled band-gap reference voltage generator circuits in accordance with various embodiments of the invention are discussed further below.

Figure 2:
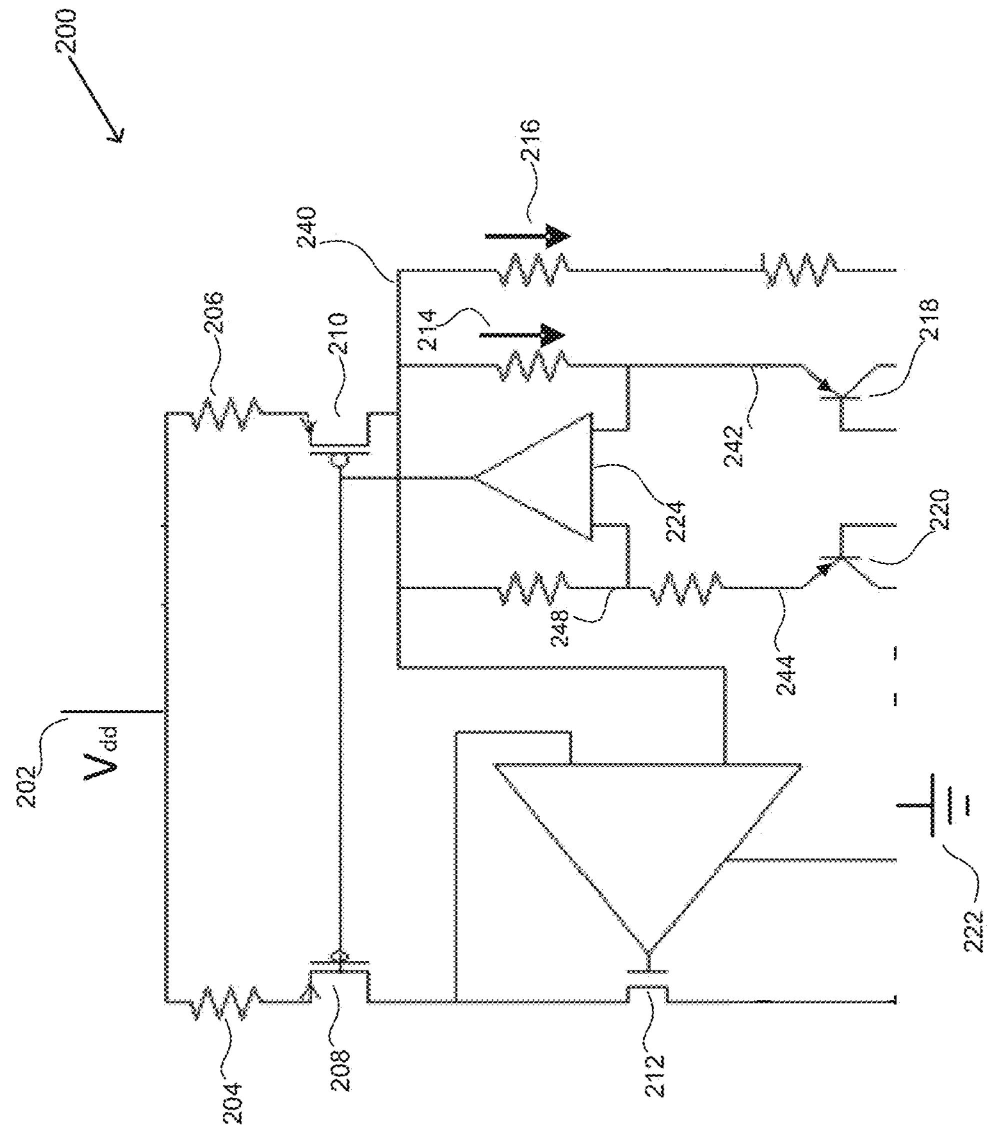
FIG. 2 (Prior Art)
FIG. 2 is a prior art circuit diagram of a band-gap reference voltage and constant current generator.

Band-gap reference voltage generator circuit can utilize dynamic element matching in load transistors to reduce offset. The load transistor can have random offset current. In many embodiments, the load transistors can be rotated among themselves so that each diode can see all the transistors over a period of time. This will effectively average out any mismatch on the currents. A prior art circuit diagram of a band-gap reference voltage generator 200 is illustrated in FIG. 2. In the illustrated circuit, power supply 202 is connected to load transistors 208 and 210 through resistors 204 and 206, respectively. Base and collector terminals of bipolar transistors 218 and 220 are connected to a ground node 222. An output voltage $V_{bg}$ is produced at node 240. $V_{bg}$ is derived by the following equation:

$$V_{bg}=V_{be1}+(V_T)ln(N)$$

where $V_{be1}$ 242 is a base-to-emitter voltage of bipolar transistor 218, $V_{be2}$ 244 is a base-to-emitter voltage of bipolar transistor 220, and N is a ratio of an area of bipolar transistor 220 to an area of bipolar transistor 218, $V_T$ is a temperature dependent parameter.

A first generated current 214 can be proportional to the absolute temperature ($I_{PTAT}$) and a second generated current 216 can be complementary to absolute temperature (ICTAT). An area of MOS transistor 208 can be scaled to an area of MOS transistor 210 by the factor n, where n can be, for example, 8. Note that the specific scaling factor n can vary. A higher value of n may lead to a higher beta variation in the bipolar transistor 218 and lower value results may result in higher amplification noise.

Opamp 224 can be utilized to achieve dynamic element matching in the load transistors 208 and 210, by continuously comparing a voltage at node 242 to a voltage at node 248, and providing a feedback signal. The feedback signal is provided by forcing a voltage at a common gate of load transistors 208 and 210. Since the diode voltage is independent of the current, the mismatch from the opamp or the load transistors can have minimal impact on bandgap voltage and hence opamp 224 is not chopped. Discrete-time sampled circuit to generate band-gap reference voltage is discussed below.

Figure 3:
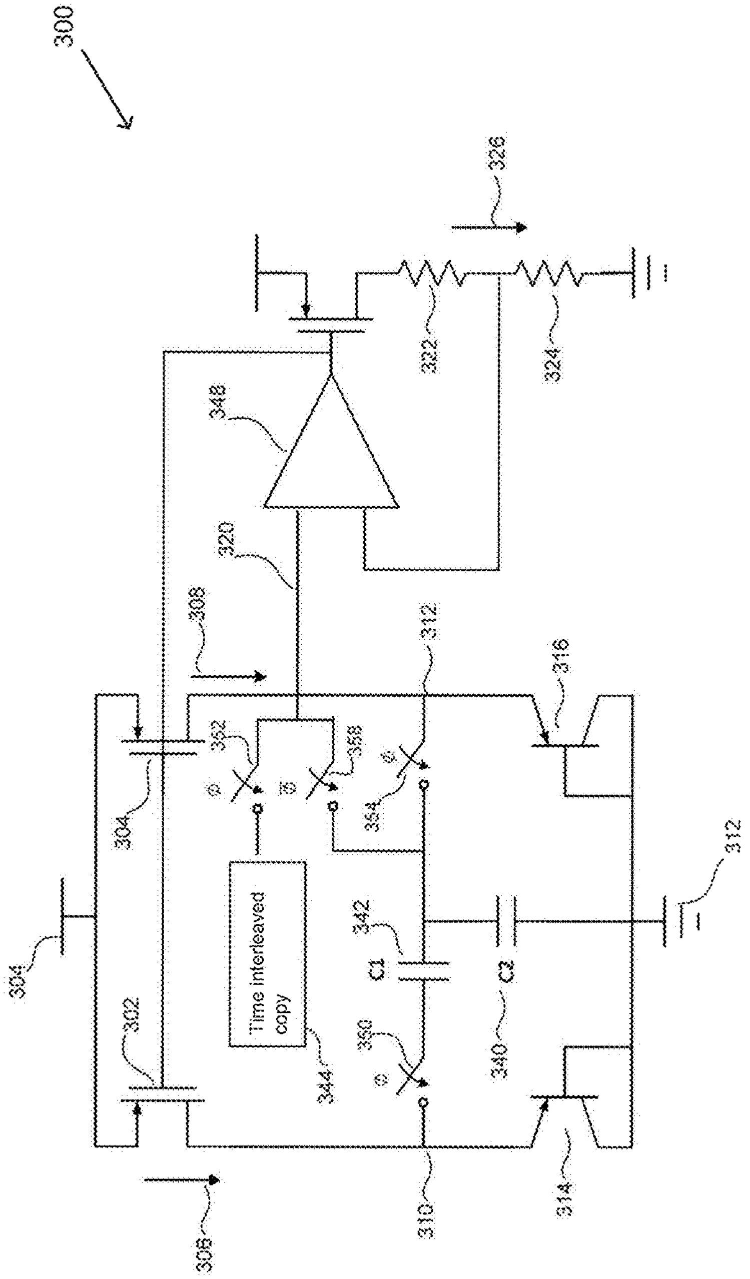
FIG. 3 is a circuit diagram of a band-gap reference voltage generator where the output of the bandgap is sampled in accordance with an embodiment of the invention.

In various embodiments, a sampled band-gap reference voltage generator circuit can utilize capacitors to sum up base-to-emitter voltages of bipolar transistors within the sampled band-gap reference voltage generator circuit. A circuit diagram of a sampled band-gap reference voltage generator 300 in accordance with an embodiment of the invention is illustrated in FIG. 3. In particular, FIG. 3 illustrates a first load transistor 302 comprising a gate, a source and a drain, a second load transistor 304 comprising a gate, a source and a drain, where the gates of the first and second load transistors are connected, and where the sources of the first and second load transistors are connected, a first bipolar transistor 314 that includes a base, an emitter and a collector terminal, a second bipolar transistor 316 including a base, an emitter and a collector terminal, where the bases of the first and second bipolar transistors are connected, and where the collectors of the first and second bipolar transistors are connected; and a first capacitor C1 342 having a first and a second terminal, where the first terminal of the first capacitor 342 is connected to the emitter of the first bipolar transistor through a first switch 350 and the second terminal of the first capacitor 342 is connected to the emitter of the second bipolar transistor 316 through a second switch 354. The circuit can include a second capacitor C2 340 having first and a second terminals, wherein the first terminal of the second capacitor 340 is connected to the second terminal of the first capacitor 342 and the second terminal of the second capacitor 340 is connected to ground 312. The circuit can include a third switch 358 connected to the first terminal of the second capacitor 340 and going to an output.

In the illustrated embodiment, power supply 304 is connected to source terminals of load transistors 302 and 304. Base and collector terminals of bipolar transistors 314 and 316 are connected to a ground node 312. An output voltage $V_{bg}$ is produced at node 320. $V_{bg}$ can be derived by the following equation:

$$V_{bg}=V_{be1}+n(V_{be1}-V_{be2})$$

where $V_{be1}$ 312 is a base-to-emitter voltage of bipolar transistor 316, $V_{be2}$ 310 is a base-to-emitter voltage of bipolar transistor 314, and n is a ratio of an area of bipolar transistor 314 to an area of bipolar transistor 316. Moreover:

$$V_{bg}=(n+1)V_{be1}-nV_{be2}=(n+1)(V_{be1}-n/(n+1)V_{be2})$$

where a ratio n/(n+1) is implemented by utilizing capacitors C1 342 and C2 340.

Currents 308 and 306 can be proportional to a value of output voltage $V_{bg}$. The output voltage $V_{bg}$ can be applied by opamp 348 across a resistor divider formed by resistors 322 and 324 to generate an output current 326, which is proportional to the output voltage $V_{bg}$. Switches 350, 352, 354 and 358 can be used for sampling. Switches 350, 352 and 354 can be clocked using Ø and Switch 358 can be clocked using $\overline{Ø}$, being out of phase by 180 degrees. The switch 352 can be clocked using a time interleaved copy of $V_{bg}$ 344 can be provided. In many embodiments, the interleaved copy can have similar C1 342 and C2 340 and the clock phases may be separated by 180 degrees. In certain embodiments, time interleaving can be done to ensure continuous conduction in the loop.

Although various sampled band-gap reference voltage generator circuits are described above with reference to FIG. 3 that provide sampled and interleaved bandgap voltage, any of a variety of sampled band-gap reference voltage generator circuits that provide sampled and interleaved bandgap voltage may be utilized as appropriate to the requirements of specific applications in accordance with various embodiments of the invention. Simulation and measurement results are discussed further below.

Figure 4:
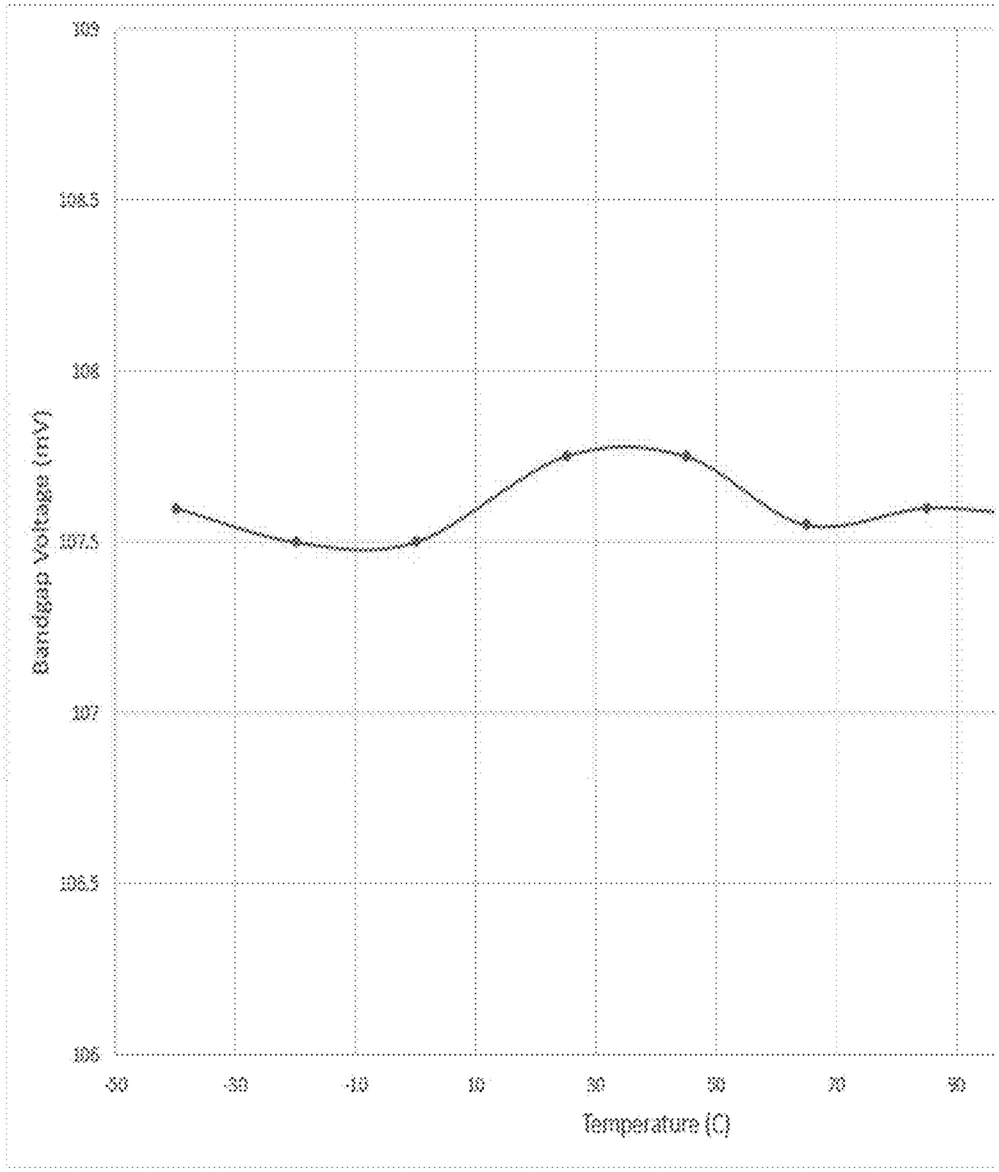
FIG. 4 shows measurement results of a band-gap reference voltage generator circuit where bandgap voltage is plotted as a function of temperature in accordance with an embodiment of the invention.

The bandgap voltage generated by this sampled-bandgap reference circuit was measured at temperatures varying from −40 C to 125 C. These results are shown in FIG. 4.

Figure 5A:
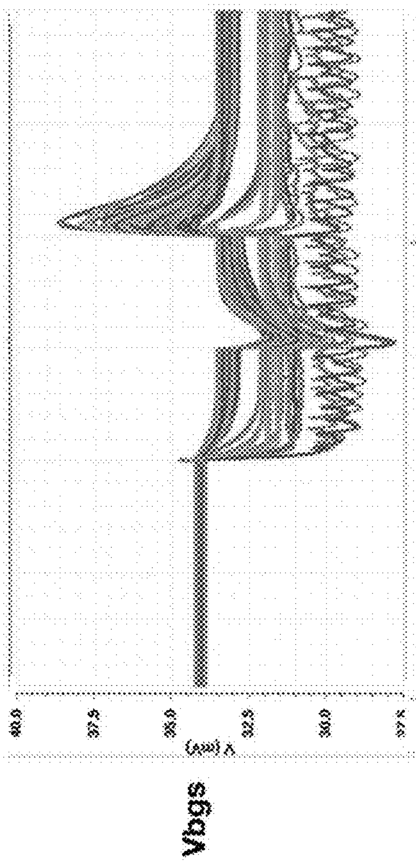
FIG. 5A shows simulation results of transient operation of a band-gap reference voltage generator circuit, where $V_{bgs}$ is plotted as a function of time.
Figure 5B:
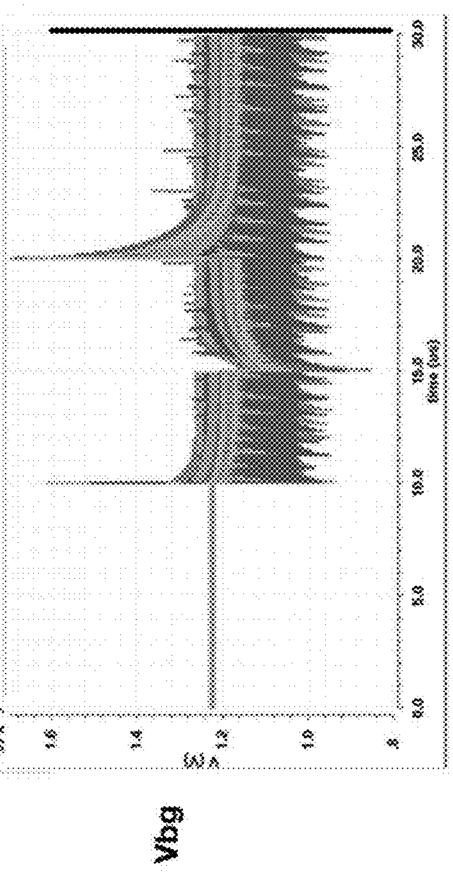
FIG. 5B shows simulation results of transient operation of a band-gap reference voltage generator circuit, where $V_{bg}$ is plotted as a function of time.

Cadence circuit simulator (Cadence Design Systems Inc, San Jose, CA) can be utilized to simulate the performance of sampled band-gap reference voltage generator circuits implemented in accordance with various embodiments of the invention. Cadence simulation results for transient operation of a sampled band-gap reference voltage generator circuit implemented in accordance with an embodiment of the invention are shown in FIGS. 5A and 5B. In FIG. 5A, $V_{bgs}$ is plotted as a function of time. In many embodiments, $V_{bgs}$ can be the internal node in the bandgap circuit where a large impulse current can be injected to check the stability.

In FIG. 5B, band-gap output voltage $V_{bg}$ is plotted as a function of time. As shown in FIGS. 5A and 5B, the transient voltages settle within one ring cycle, which indicates that the sampled band-gap reference voltage generator circuit is unlikely to oscillate during ordinary operation.

Many embodiments provide for a bandgap reference circuit based on switched capacitor discrete circuit. In certain embodiments, discrete time implementation can be done using operational amplifiers, resistors or capacitors in conjunction with switches.

In many embodiments, operational amplifier can be replaced by other Voltage to Current converters topologies to generate a current through load transistors that is proportional to Bandgap voltage. In many embodiments, multiple time-interleaved copies of a bandgap core may be used where the number of copies N can range from 1 to infinity.

While the above descriptions and associated figures have depicted a sampled band-gap reference voltage generator circuit, it should be clear that any of a variety of configurations for sampled band-gap reference voltage generator circuits can be implemented in accordance with embodiments of the invention. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. A band-gap reference voltage generator circuit, comprising:

core circuitry comprising:

a first load transistor comprising a gate, a source and a drain;

a second load transistor comprising a gate, a source and a drain, wherein the gates of the first and second load transistors are connected, and wherein the sources of the first and second load transistors are connected;

a first bipolar transistor comprising a base, an emitter and a collector terminal;

a second bipolar transistor comprising a base, an emitter and a collector terminal, wherein the bases of the first and second bipolar transistors are connected, and wherein the collectors of the first and second bipolar transistors are connected;

a first capacitor having a first and a second terminal, wherein the first terminal of the first capacitor is connected to the emitter of the first bipolar transistor through a first switch and the second terminal of the first capacitor is connected to the emitter of the second bipolar transistor through a second switch;

a second capacitor having first and a second terminals, wherein the first terminal of the second capacitor is connected to the second terminal of the first capacitor and the second terminal of the second capacitor is connected to ground; and a third switch connected to the first terminal of the second capacitor and going to an output;

wherein an output voltage $V_{bg}$ is produced at a first node, wherein $V_{bg}$ is derived by the following equation:

$$V_{bg}=V_{be1}+n(V_{be1}-V_{be2})$$

where $V_{be1}$ is a base-to-emitter voltage of the second bipolar transistor, $V_{be2}$ is a base-to-emitter voltage of the first bipolar transistor, and n is a ratio of an area of the first bipolar transistor to an area of the second bipolar transistor (316), wherein $$V_{bg}=(n+1)V_{be1}-nV_{be2}=(n+1)(V_{be1}-n/(n+1)V_{be2})$$

where a ratio n/(n+1) is implemented by utilizing the first capacitor and the second capacitor.

2. The band-gap reference voltage generator circuit of claim 1, wherein the first switch and the second switch are operated in a first sampling period and the third switch is operated after turning off the first switch and the second switch.

3. The band-gap reference voltage generator circuit of claim 1, wherein similar instances are time interleaved.

4. The band-gap reference voltage generator circuit of claim 1, further comprising an operational amplifier (Opamp) with a first terminal, a second terminal, and a third terminal, wherein the first terminal is connected to the core circuitry through a plurality of switches and the second terminal is connected through a resistor divider comprising a plurality of resistors and the third terminal is connected to the gates of the first and second load transistors generating a current.

5. The band-gap reference voltage generator circuit of claim 1, further comprising a voltage to current converter.

6. The band-gap reference voltage generator circuit of claim 1, wherein a first current and a second current are proportional to a value of output voltage $V_{bg}$.

7. The band-gap reference voltage generator circuit of claim 6, wherein the output voltage $V_{bg}$ is applied by an operational amplifier (Opamp) across a resistor divider formed by a first resistor and a second resistor to generate an output current that is proportional to the output voltage $V_{bg}$.

8. The band-gap reference voltage generator circuit of claim 7, further comprising a fourth switch used for sampling, wherein the first switch, the second switch and the fourth switch are clocked using Ø and third switch is clocked using $\overline{Ø}$, being out of phase by 180 degrees.

9. The band-gap reference voltage generator circuit of claim 8, wherein the fourth switch is clocked using a time interleaved copy of $V_{bg}$, wherein the interleaved copy has similar first capacitor and second capacitor and the clock phases are separated by 180 degrees.

* * * * *